United States Patent [19]
Loew

[11] Patent Number: 5,128,829
[45] Date of Patent: Jul. 7, 1992

[54] HINGE AND STAND FOR HAND-HELD COMPUTER UNIT

[75] Inventor: Christopher Loew, San Francisco, Calif.

[73] Assignee: Health Innovations, Inc., Reston, Va.

[21] Appl. No.: 640,108

[22] Filed: Jan. 11, 1991

[51] Int. Cl.$^5$ ............... H05K 5/00; A47B 21/00; G06C 5/02
[52] U.S. Cl. ............... 361/380; 361/393; 312/325; 312/208.1; 235/1 D
[58] Field of Search ........... 364/705.02, 708; D18/6, D18/7, 11; 312/325, 208; 248/455, 459; 16/225; 206/305; 361/380, 392, 393, 394, 395; 235/1 D, 145 R

[56] References Cited

U.S. PATENT DOCUMENTS

| | | | |
|---|---|---|---|
| 236,414 | 1/1881 | Briggs | 217/57 |
| D. 309,628 | 7/1990 | Sawada et al. | D18/11 |
| 2,067,602 | 1/1937 | Dorfman | 248/472 |
| 2,389,511 | 4/1945 | Horr | 40/152.1 |
| 2,523,202 | 4/1950 | Ericson | 281/33 |
| 3,202,310 | 8/1965 | Tibbets | 16/225 X |
| 3,222,437 | 12/1965 | Schilling | 264/54 |
| 3,320,225 | 5/1967 | Bradbury | 16/225 X |
| 3,441,975 | 5/1969 | Shepherd | 16/225 |
| 3,752,503 | 8/1973 | Holes et al. | 281/17 |
| 3,793,612 | 2/1974 | Driscoll | 439/402 |
| 4,002,184 | 3/1977 | Lloyd | 206/305 |
| 4,062,139 | 12/1977 | Klösel | 40/533 |
| 4,089,467 | 5/1978 | Makowicki | 220/334 |
| 4,259,568 | 3/1981 | Dyneson | 206/305 X |
| 4,571,456 | 2/1986 | Paulsen et al. | 379/96 |
| 4,645,275 | 2/1987 | Pucci | 312/244 |
| 4,667,299 | 5/1987 | Dunn | 364/708 |
| 4,703,161 | 10/1987 | McLean | 235/1 D |
| 4,726,091 | 2/1988 | Joyce | 16/227 |
| 4,847,798 | 7/1989 | Kurashima | D18/7 X |
| 4,989,926 | 2/1991 | Snow, Jr. | 312/325 X |

FOREIGN PATENT DOCUMENTS

| | | | |
|---|---|---|---|
| 2439807 | 3/1976 | Fed. Rep. of Germany | 16/225 |
| 2368091 | 5/1978 | France | 364/705.1 |

Primary Examiner—Leo P. Picard
Assistant Examiner—Michael W. Phillips
Attorney, Agent, or Firm—Nixon & Vanderhye

[57] ABSTRACT

The computer includes a computer housing, a cover and a hinge. The hinge overlies the top face of the housing and has three flaps defining a pair of spaced hinged axes, the edge flaps being secured to the rear face of the housing and the proximal edge of the cover, respectively. The cover is pivoted between positions covering the display screen and control elements closing the computer and an open position. In one open position, the cover is pivoted into opposition into the rear face of the housing and latched in that position whereby the cover serves as the base of a stand for the housing with the intermediate flap of the hinge serving as a generally upright support leg supporting and elevating the upper edge of the housing, whereby the display screen and controls lie in a plane inclined to the horizontal.

13 Claims, 5 Drawing Sheets

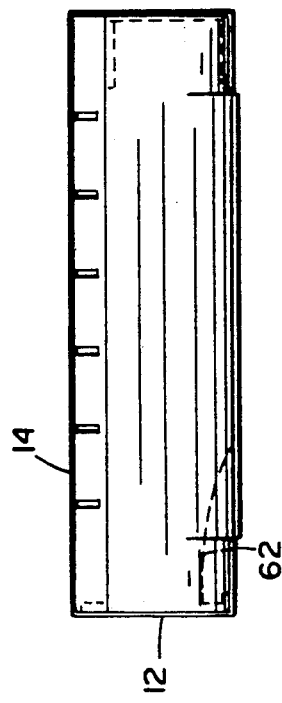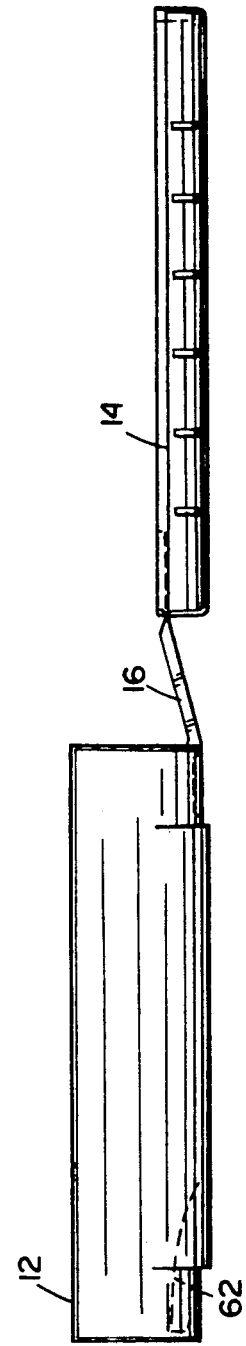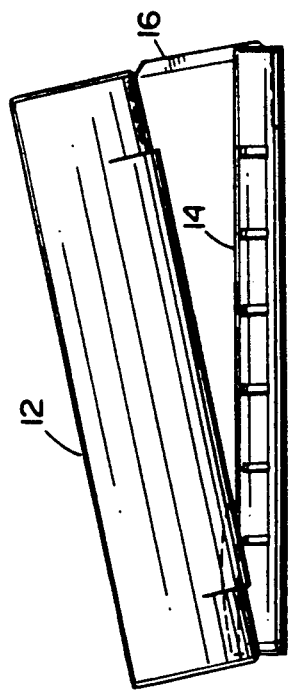

HINGE AND STAND FOR HAND-HELD COMPUTER UNIT

RELATED APPLICATIONS

The present invention is related to the following commonly-assigned co-pending patent applications, each of which herein by reference: Ser. No. 07/638,899, filed Jan. 11, 1991, entitled "A Timer for Protecting a Storage Battery in a Microprocessor Device," invented by Brenneman et al.; Ser. No. 07/639,425, filed Jan. 11, 1991, entitled "Method and Apparatus to Control Weight Loss Using Human Behavior Modification Techniques," invented by Abrams et al.; Design patent application Ser. No. 07/640,010, filed Jan. 11, 1991, entitled "Hand-Held Computer Housing With Cover" invented by Christopher Loew; Design patent application Ser. No. 07/639,991, filed Jan. 11, 1991, entitled "Housing for a Hand-Held Computer" invented by Christopher; and Design patent application Ser. No. 07/639,993, filed Jan. 11, 1991, entitled "Hand-Held Computer" invented by Christopher Loew.

BACKGROUND AND SUMMARY OF THE INVENTION

The present invention relates to a hand-held computer unit, for example, of the type for use as a portable weight control device for generating visual and audio prompts to signify times to eat and exercise and other computer-generated information relating to weight control. The present invention particularly relates to a compact, hand-held computer unit having a hinged cover movable between a closed position covering and overlying the computer display screen, an open position wherein the computer may lay flat on a surface and an elevated open position wherein the cover and hinge form a stand for the computer to facilitate viewing the display screen and operating the computer control elements.

As will be appreciated from a review of the present application and those applications identified above, the hand-held portable self-contained computer unit of the present invention comprises a weight control device that generates visual and audio prompts for assisting the control or modification of a user's behavior, for example, by signifying times to eat and exercise, providing suggestions for what to eat, etc. The unit also assists in setting safe goals regarding an individual's desired weight loss and the time required to achieve the desired weight loss. The user follows menu and exercise programs generated by the computer and it records the user's food consumption and exercise activity. Finally, the unit displays feedback information regarding the user's progress toward achieving the desired weight. Feedback is provided immediately upon recording food consumption and exercise, at the end of each day and weekly. This hand-held computer unit therefore provides a complete weight control program that is effective, simple to use and desirably portable.

Reference is made to the above-identified utility patent applications for details of the computer program for generating the information and the protection afforded such information in the event of a power failure or a need to change power sources. The present invention focuses on features of the compact computer and display unit which facilitate its portability and useability. More particularly, the present invention relates to a combination cover, computer housing with display screen and a hinge wherein the cover is movable between a closed position overlying a display screen and open positions facilitating viewing the display screen and operating its control elements. In one open position, the housing, cover and hinge may lie flat on a generally horizontal surface. Alternatively, particularly where the housing is hand-held, the cover may hang freely from the housing. In another open position, the hinge and cover are arranged to enable the computer housing, including the display screen, to be supported in an inclined position to facilitate viewing the display screen and operation of the control elements for the computer, thereby serving as a stand therefor.

More particularly, the hand-held computer unit includes a generally rectilinear housing for the circuit board, display screen and control elements. The display screen and control elements are, of course, provided on the front face of the housing and the housing is shaped to facilitate operation when held by a user or when disposed on a flat, generally horizontal surface. Particularly, the cover is pivotally secured to the housing by a hinge, preferably formed integrally of a one-piece plastic construction. The hinge includes two spaced axes for pivotal movement of the cover from a position overlying the display screen, and preferably the control elements on the front face of the housing, and a second position removed therefrom enabling interactive operation of the unit by the user. The hinge is secured along the rear face of the housing adjacent a top face thereof, the latter being recessed to receive the hinge when the cover overlies the display screen, closing the unit. This affords a flush mounting of the hinge along the top face of the housing. The hinge connects with the proximal edge portion of the cover and weakened areas of the hinge define the spaced pivotal axes. The inside face of the cover has recesses which register with and accommodate the projecting control elements on the front face of the housing when the cover closes the computer housing. A suitable catch, preferably a pair of magnetically actuated catches along opposite sides of the cover, releasably secure the cover in the closed position overlying the display screen and control elements.

When the cover is removed to expose the front face of the housing so that the display unit can be viewed and the control elements operated, the hinge permits the cover to hang freely from the housing. In this manner, the computer unit may be held and supported by the user's hand or hands and operated. When it is desirable to operate the computer on a flat, generally horizontal surface, the computer may simply be set down on the flat surface with the cover extending from the hinge and housing generally in the same plane. When it is desired to operate the computer with the computer cover and hinge forming a stand for the computer housing, the cover is pivoted rearwardly to lie in opposition to the rear face of the housing. The distal edge of the cover and the edge portion of the rear face of the housing remote from the hinge carry a cooperating catch for releasably securing the cover in opposition to the rear face of the housing. In that position, the cover, hinge and housing lie in planes which intersect one another to define a generally triangular configuration. Thus, with the cover disposed on a generally horizontal surface, the hinge forms a generally upright support leg elevating the upper edge of the computer housing. The lower edge of the computer housing lies in contact and securement with the distal end of the cover. Consequently, the computer housing an importantly, the display screen and control elements, are inclined relative to the horizontal surface with the hinge and cover forming a stand thereby facilitating viewing the display screen and operating the control elements.

In a preferred embodiment according to the present invention, there is provided a hand-held computer unit comprising a housing having a discrete width and front and rear faces, a screen on the front face of the housing for displaying computer generated information and a cover carried by the housing for selective movement between positions overlying and covering the display screen and removed therefrom into opposition to the rear face. A hinge interconnecting the housing and cover enables the cover to move between such positions, the hinge being formed integrally of plastic material with two weakened areas spaced one from the other to define a pair of discrete, generally parallel, hinge axes pivotally connecting the hinge and the housing and the hinge and the cover, respectively. The distance between the hinge axes approximates the width of the housing.

In a further preferred embodiment according to the present invention, there is provided a hand-held computer unit comprising a housing having front and rear faces, a screen on the front face for displaying computer generated information, and a cover carried by the housing for selective movement between a first position overlying and covering the display screen and a second position removed therefrom into opposition to the rear face. Also provided is a hinge interconnecting the housing along an upper edge portion thereof and a proximal edge portion of the cover enabling the cover for movement between the first and second positions, the cover in the second position forming a generally horizontal base for supporting the unit on a generally horizontal surface with the hinge forming a generally upright leg elevating and supporting the upper edge portion of the housing above the cover and horizontal surface whereby the housing lies in an inclined position relative to the horizontal surface to facilitate use of the computer.

In a further preferred embodiment according to the present invention, there is provided a hand-held computer unit comprising a housing having a discrete width with top, front and rear faces, a screen on the front face for displaying computer generated information and a cover carried by the housing for selective movement between a closed position overlying and covering the display screen and an open position removed therefrom. A hinge interconnects the housing and the cover enabling the cover to move between such positions, the hinge being formed integrally of one piece plastic material with two weakened areas spaced one from the other to define a pair of discrete, generally parallel, hinge axes pivotally connecting the hinge and the housing and hinge and the cover, respectively. The distance between the hinge axes approximates the width of the housing, and one of the hinge axes lies adjacent the juncture of the top and rear faces, the cover being movable into the open position wherein planes passing through the housing, the hinge and the cover lie generally parallel to or coincident with one another.

Accordingly, it is a primary object of the present invention to provide a novel and improved hand-held computer unit with integrated display screen having a cover and a hinge facilitating opening and closure of the computer unit, its support in a plurality of display positions and portability of the unit.

These and further objects and advantages of the present invention will become more apparent upon reference to the following specification, appended claims and drawings.

BRIEF DESCRIPTION OF THE DRAWING FIGURES

FIG. 4 is a side elevational view of the housing, hinge and cover, with the computer unit in an open position resting on a flat generally horizontal surface;

FIG. 5 is a side elevational view thereof with the cover in a closed position as in FIG. 1;

FIG. 8 is a side elevational view thereof;

Figure 1:
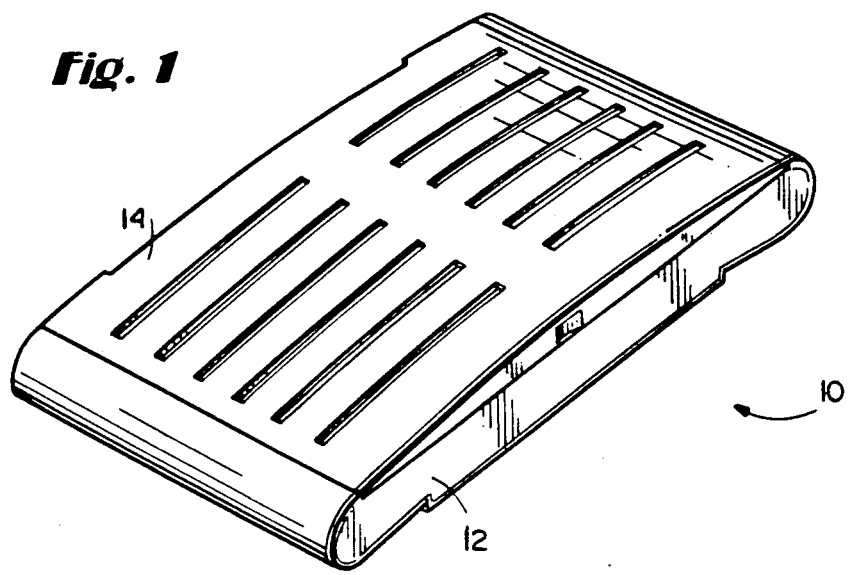
FIG. 1 is a perspective view of a hand-held computer unit constructed in accordance with the present invention illustrating the housing and cover therefor in a closed position.

FIG. 1—1 is a view of the opposite side of the hinge; and

Figure 10:
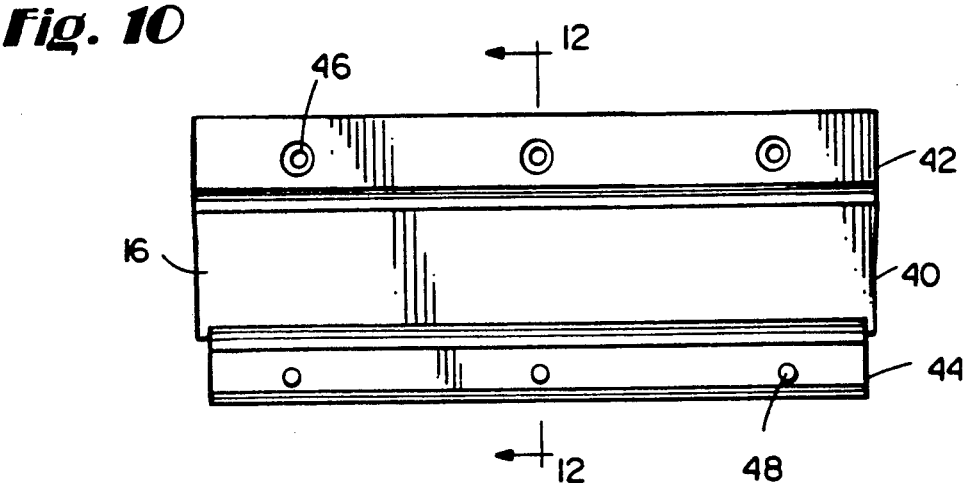
FIG. 10 is an enlarged view of one side of the hinge as viewed from the opposite side thereof illustrated in FIG. 3.
Figure 12:
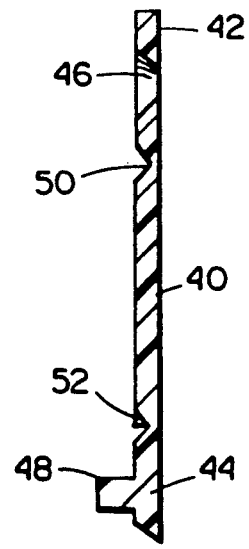

FIG. 12 is an enlarged cross-sectional view thereof taken generally about on line 12—12 in FIG. 10.

DETAILED DESCRIPTION OF THE DRAWING FIGURES

Reference will now be made in detail to a present preferred embodiment of the invention, an example of which is illustrated in the accompanying drawings.

Referring now to the drawings, particularly to FIG. 1, there is illustrated a computer unit constructed in accordance with the present invention and generally designated 10. Computer unit 10 comprises a housing 12, a cover 14 and a hinge 16 (FIG. 2) interconnecting the housing 12 and cover 16. Housing 12 houses the various components of the computer, including the circuit board, not shown, a display screen 18 and various control elements 20 for controlling the operation of the computer. The purpose of and the program for the computer are described in greater detail in the above-referenced utility patent applications and further description of those aspects is not believed necessary for a clear understanding of the inventive features hereof.

Figure 2:
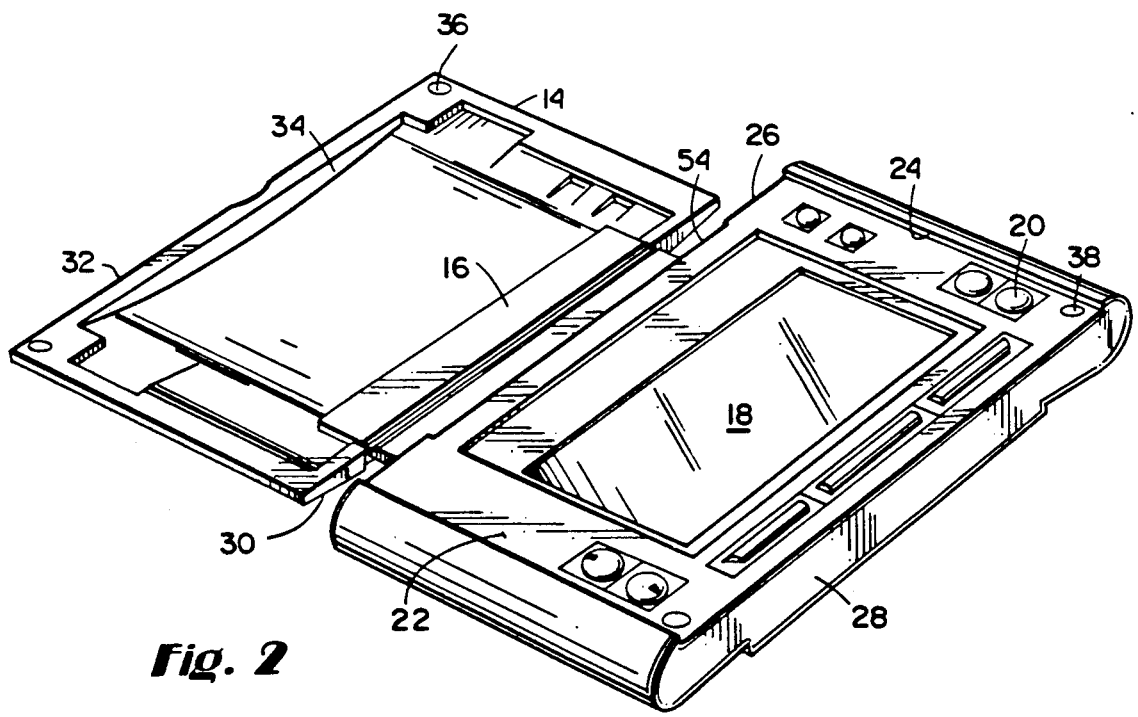
FIG. 2 is a view similar to FIG. 1 illustrating the computer unit with the cover hinged back to an open position.

As illustrated in FIG. 2, the front face 22 of housing 12 has a shallow, rectilinear recess defined by the side walls 24, the recess opening through the top and bottom faces 26 and 28 of housing 12. Cover 14 is sized to be received within the recess, with the proximal and distal edges 30 and 32 of cover 14 lying flush with the top and bottom faces 26 and 28, respectively, of housing 12 when lying in the closed position illustrated in FIG. 1. The inside face 34 of cover 14 has a plurality of recesses formed therein for registration with and receiving the control elements 20 when the cover lies in its closed position overlying the front housing face 22. Cover 14 and housing 12 carry cooperating magnetic catches at opposite corners adjacent the bottom face 28 and distal end 32, respectively, such that the cover may be retained in the closed position overlying the control elements 20 and display screen 18. The magnetic catches may comprise a magnet and magnetic material located in the cover and housing, respectively, or vice versa. For example, magnets 36 may be disposed in the corners of cover 14 and magnetic material 38 disposed in the corners of the front housing face 22. Alternatively, four magnets might be used.

Figure 11:
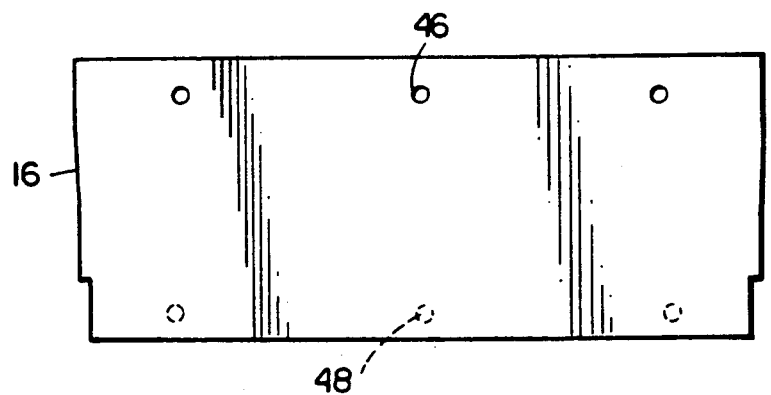

The housing and cover are formed of plastic material, preferably ABS with a clean (transparent) acrylic lens over the display. Hinge 16 is preferably formed of a polypropylene. The hinge 16, illustrated in FIGS. 10-12, comprises a unitary, generally rectilinear piece of plastic material, having intermediate and edge flaps 40, 42 and 44, respectively. Edge flap 42 is disposed in a recess along the inside face of cover 14 and is suitably secured thereto, for example, by screws or adhesive, not shown, the openings for which are illustrated at 46 in FIG. 10. Edge flap 44 is secured to the rear face of the housing 12 in a suitable recess, for example, using integrally formed pins 48. Edge flaps 42 and 44 are connected to the intermediate flap 40 by weakened areas defining parallel pivotal axes. More particularly, the weakened areas are defined by grooves 50 and 52 formed along one side of hinge 16, the material underlying the grooves defining the hinge axes. The sides of the grooves are at least preferably 90° relative to one another to enable the edge flaps to pivot 90° relative to the intermediate flap and also to pivot in the opposite direction, as will become clear from the ensuing description. As illustrated in FIG. 2, the top face 26 of body 12 has a shallow recess 54 for receiving the intermediate flap 40 of hinge 16 when the computer is closed as illustrated in FIG. 1. Thus, the intermediate flap 16 between the pivotal axes has a width substantially corresponding to the width of the housing 12.

Figure 3:
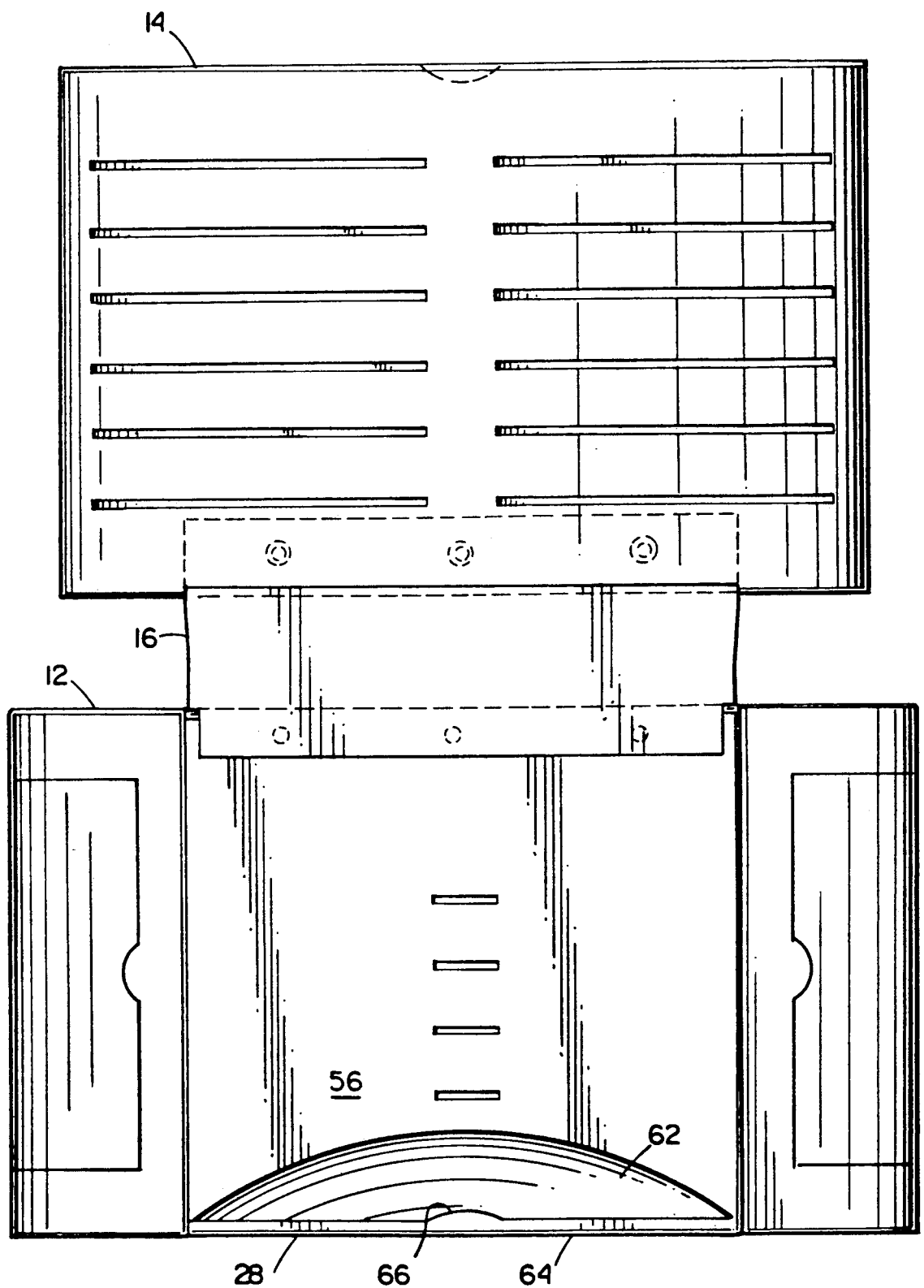
FIG. 3 is an enlarged rear elevational view of the computer unit with the cover lying in an open position.
Figure 6:
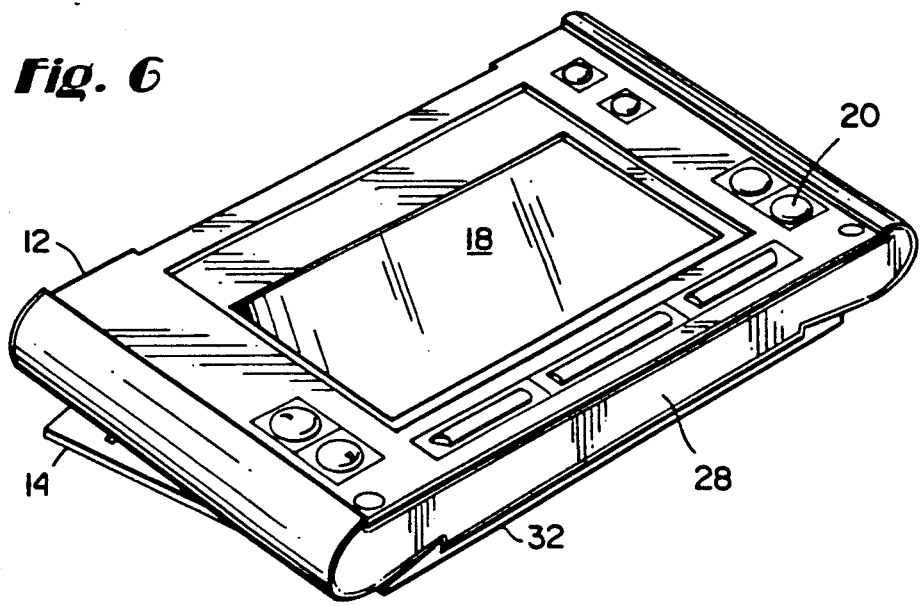
FIG. 6 is a perspective view illustrating the housing of the computer unit mounted on the cover in an inclined position relative to a flat horizontal surface.
Figure 7:
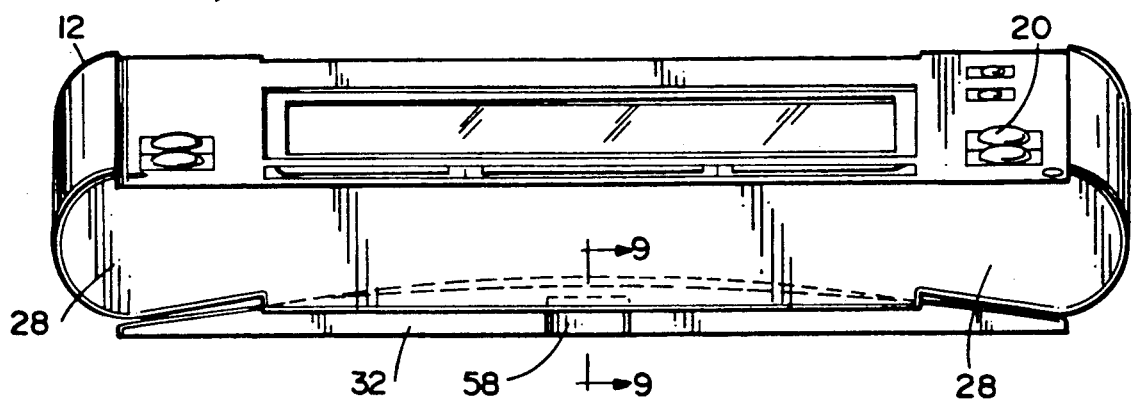
FIG. 7 is an enlarged front elevational view of the computer unit with the housing in an inclined position supported by the cover and hinge.
Figure 9:
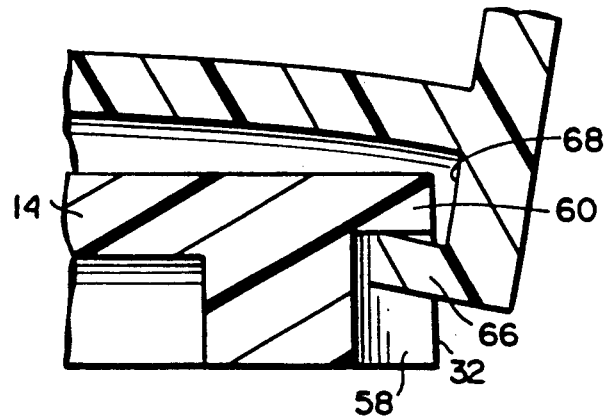
FIG. 9 is an enlarged fragmentary cross-sectional view taken generally about on line 9—9 in FIG. 7.

Referring now to FIGS. 1, 3 and 9, a cooperable catch arrangement is disposed along the distal edge 32 of cover 14 and the rear face 56 of housing 12 adjacent the bottom face 28. More particularly, the distal edge portion 32 of cover 14 has an indentation 58 (FIG. 9) leaving an overlying lip 60. The rear face 56 of housing 12 has a partial spherical recess 62 (FIG. 3) with a front lower wall 64 and a projection 66 overlying recess 62 and defining a recess 68. It will be appreciated that, when the cover and hinge cooperate to form a stand for the housing to facilitate viewing the display screen and operating the computer control elements, lips 60 and 66 are received in recesses 68 and 58, respectively, thereby locking the cover in position in opposition to the rear face of housing 12.

The computer unit may be stored in its closed position illustrated in FIG. 1, with the cover 14 lying in the recess on the front face 22 of housing 12 and secured thereto by the cooperating magnetic catches, e.g., magnet 36 and magnetic material 38. In that position, the hinge edge flaps 42 and 44 lie parallel to one another. The intermediate hinge flap 40 is received in the recess 54 in top face 26 of the housing such that hinge flap 40 lies flush with top face 26. When it is desired to use the computer, cover 14 is swung on hinge 16, preferably about both pivotal axes defined by the weakened zones thereof, into a position removed from the front face 22, thereby exposing the display screen 18 and control elements 20 for use. The user may hold housing 12 in one hand, while operating the computer with the other hand. In that position, cover 14 is freely supported from housing 12 by hinge 16. Alternatively, the housing and cover may be disposed, for example, on a flat, generally horizontal surface, whereby the user may have both hands free for operating the computer, as necessary. Thus, the computer unit may obtain the configuration illustrated in FIG. 4, with the back face of housing 12 and the front face of cover 14 lying in generally parallel planes along the flat surface. The hinge, of course, assumes an inclined position, as illustrated.

In a further alternative operating position hereof, the hinge and cover may form a stand for housing 12 whereby the housing front face 22 may be inclined to facilitate viewing the display screen and operating the control elements. To obtain this configuration, the cover 14 is pivoted about both axes such that the front face of the cover lies in opposition to the rear face of housing 12, i.e., a pivoting of cover 14 through an angle greater than 360°. When pivoted to underlie housing 12, lip 60 may be disposed in the recess 68 or, conversely, lip 66 in recess 58, to lock cover 14 and housing 12 in the position illustrated in FIG. 8. In that position, the inside face of cover 14 may rest on a generally horizontal surface, with the hinge 16 forming a generally upright support leg elevating the upper edge portion of the housing whereby the entire housing lies in an inclined position. Thus, the user may rest the computer unit on a flat horizontal surface with the cover and hinge serving as a stand, thereby facilitating viewing the display screen and operation of the control elements.

To close the unit, the cover and housing are displaced relative to one another to remove the lips 60 and 66 from their corresponding recesses 68 and 58, respectively, whereby the cover is free to pivot with hinge 16 into another position, for example, into position closing the unit, as illustrated in FIG. 1.

In a specific preferred embodiment hereof, the computer unit may be approximately 6.7 inches long, 3.8 inches wide and 0.7 inches in depth. The computer is also light in weight, weighing slightly less than one pound, including four AA batteries.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A hand-held computer unit comprising:
   a housing having a discrete width and front and rear faces, said front face having a shallow, generally rectilinear recess defined by side walls of said housing having front face portions forming part of said front face;
   a screen on said front face within said recess for displaying computer generated information;
   a cover carried by said housing for selective movement between positions overlying and covering said display screen and in opposition to said rear face, said cover in said overlying and covering position disposed within said recess between said side walls with the cover having a front face portion forming a continuation of the front face portions of said side walls; and a hinge interconnecting said housing and said cover enabling said cover for movement between said positions;

said hinge being of a plastic material with two weakened areas spaced one from the other to define a pair of discrete, generally parallel, hinge axes pivotally connecting said hinge and said housing and said hinge and said cover, respectively;

the distance between said hinge axes approximating the width of said housing;

a plurality of control elements projecting from said front face within said recess, said cover having an inside face in opposition to said front face when overlying said display screen and having a plurality of discrete recesses formed therein for receiving and overlying said projecting control elements, respectively, when said cover overlies said display screen.

2. A unit according to claim 1 wherein said housing has a top face between said front and rear faces, said hinge being secured to said housing adjacent the juncture of said rear face and said top face.

3. A unit according to claim 1 wherein each said weakened area is defined by a groove along one side of said hinge.

4. A unit according to claim 3 wherein said hinge is secured to said housing adjacent the juncture of said rear face and said top face.

5. A unit according to claim 1 including a magnet carried by one of said housing and said cover and magnetic responsive material carried by the other of said housing and said cover for releasably securing said cover in position overlying and covering said display screen.

6. A unit according to claim 1 including a releasable catch cooperable between said housing and said cover for releasably retaining said cover in opposition to said rear face.

7. A unit according to claim 6 wherein said catch cooperates between the distal end of said cover and a rear face portion of said housing remote from said hinge.

8. A unit according to claim 1 wherein said cover and said housing generally define discrete planes, the planes of said cover and said housing defining an acute angle therebetween when said cover lies in opposition to said rear face.

9. A unit according to claim 8 including a releasable catch cooperable between said housing and said cover for releasably retaining said cover in opposition to said rear face.

10. A unit according to claim 1 wherein said housing has upper and lower portions, a releasable catch adjacent the distal edge of said cover remote from said hinge and cooperable with said lower portion of said housing remote from said hinge for releasably securing the distal edge of said cover and said housing one to the other, said cover forming a base for supporting the unit on a generally horizontal surface when in opposition to said rear face with said hinge elevating said upper portion of said housing and supporting said housing in an inclined position relative to said horizontal surface for viewing the display screen.

11. A unit according to claim 10 wherein said housing has a top face between said front and rear faces, said hinge being secured to said housing adjacent the juncture of said rear face and said top face.

12. A unit according to claim 1 wherein said cover, said housing and said hinge lie in discrete intersecting planes when said cover lies in opposition to the rear face of said housing, the sum of the angles between said intersecting planes being 180°.

13. A unit according to claim 1 wherein said cover is carried by said hinge for movement into a position wherein planes passing through said housing, said hinge and said cover lie generally parallel to one another.

* * * * *